(12) United States Patent
Schantz et al.

(10) Patent No.: US 10,518,577 B1
(45) Date of Patent: Dec. 31, 2019

(54) CASTER INSTALLATION SYSTEM

(71) Applicant: Shepherd Hardware Products, LLC, Three Oaks, MI (US)

(72) Inventors: John Schantz, Forked River, NJ (US); Derek Hines, Stevensville, MI (US); Denis Belec, Goodwood (CA)

(73) Assignee: SHEPHERD HARDWARE PRODUCTS, LLC, Three Oaks, MI (US)

( * ) Notice: Subject to any disclaimer, the term of this patent is extended or adjusted under 35 U.S.C. 154(b) by 0 days.

(21) Appl. No.: 16/130,314

(22) Filed: Sep. 13, 2018

Related U.S. Application Data (60) Provisional application No. 62/560,346, filed on Sep. 19, 2017, provisional application No. 62/649,117, filed on Mar. 28, 2018.

(51) Int. Cl.
*B60B 33/00* (2006.01)

(52) U.S. Cl.
CPC ...... *B60B 33/0007* (2013.01); *B60B 33/0028* (2013.01); *B60B 33/0042* (2013.01)

(58) Field of Classification Search
CPC ....... B60B 29/002; B60B 30/10; B60B 33/00; B60B 33/001; B60B 33/0018; B60B 33/0002; B60B 33/0023; B60B 33/0026; B60B 33/04; B60B 33/0042; B60B 33/0044; B60B 33/0007; B60B 33/0028; B62B 230/08; B62B 230/10; B62B 2202/02; B62B 2202/10; B62B 2202/12; B62B 2206/02; B62B 5/0083; B62B 5/0086; B62B 3/02; B62B 3/002; B62B 1/12; B62B 1/16; B62B 1/264; A47B 91/06; A47B 91/12; A47B 91/16; Y10T 16/19; Y10T 16/191; Y10T 16/203
See application file for complete search history.

(56) References Cited

U.S. PATENT DOCUMENTS

| 626,439 | A | | 6/1899 | Noelting | |
|---|---|---|---|---|---|
| 1,458,812 | A | | 6/1923 | Fay | |
| 1,879,429 | A | | 9/1932 | Noelting et al. | |
| 1,929,743 | A | | 10/1933 | Jarvis et al. | |
| 2,502,759 | A | * | 4/1950 | Singer | A47B 91/04 16/21 |
| 2,691,793 | A | * | 10/1954 | Jacobs | B60B 33/00 16/18 R |
| 3,128,495 | A | | 4/1964 | Tooth | |
| 3,197,802 | A | | 8/1965 | Fontana et al. | |
| 3,526,921 | A | * | 9/1970 | Aupke | A45C 5/143 16/43 |
| 3,768,116 | A | * | 10/1973 | Propst | B60B 33/0002 16/43 |

(Continued)

*Primary Examiner* — Chuck Y Mah
(74) *Attorney, Agent, or Firm* — Thompson Coburn LLP (57) ABSTRACT

A system includes (i) a caster having a first stem portion with a first stem portion connection configuration; and (ii) a set of second stem portions having an identical second stem portion connection configuration but having outer dimensions differing from outer dimensions of another second stem portion in the set of second stem portions. The caster first stem portion connection configuration is adapted to mate with the second stem portion connection configuration of the second stem portions in the set of second stem portions.

20 Claims, 8 Drawing Sheets

(56) References Cited

U.S. PATENT DOCUMENTS

| | | | | |
|---|---|---|---|---|
| 4,068,342 A * | 1/1978 | Carrier | B60B 33/0002 | 16/21 |
| 4,103,919 A * | 8/1978 | Greenheck | B62B 5/0083 | 248/907 |
| 4,361,930 A * | 12/1982 | Seesengood | B60B 33/0002 | 16/38 |
| 4,576,391 A * | 3/1986 | Gerstner | B60B 33/0002 | 16/30 |
| 4,793,021 A * | 12/1988 | Deasy | B60B 33/0002 | 16/273 |
| 5,062,178 A * | 11/1991 | Chiu | B60B 33/0002 | 16/30 |
| 6,419,198 B1 * | 7/2002 | Einav | A47B 91/005 | 248/346.03 |
| 6,701,570 B2 * | 3/2004 | Henriott | A47B 21/06 | 16/18 R |
| 6,796,001 B1 * | 9/2004 | Finkelstein | B60B 33/0002 | 16/19 |
| 7,350,269 B2 * | 4/2008 | Dominic | B60B 33/0002 | 16/19 |
| 7,552,508 B2 * | 6/2009 | Underwood | B60B 33/0002 | 16/30 |
| 7,762,566 B2 * | 7/2010 | Wang | B62B 5/0083 | 280/651 |
| 8,251,391 B2 * | 8/2012 | Kohler | A61G 5/10 | 16/18 R |
| 9,155,392 B2 * | 10/2015 | Baas | B60B 33/0042 | |
| 9,428,008 B2 * | 8/2016 | Carpinella | B60B 33/0002 | |
| 9,499,301 B1 * | 11/2016 | Christie | B65D 19/42 | |
| 9,861,170 B1 * | 1/2018 | Hamaty | A45C 9/00 | |
| 2006/0075600 A1 * | 4/2006 | Dominic | B60B 33/0002 | 16/32 |
| 2009/0056070 A1 * | 3/2009 | James | B60B 33/0002 | 16/45 |
| 2010/0306961 A1 | 12/2010 | Breyer | | |
| 2013/0104337 A1 * | 5/2013 | Nabb | B60B 33/0026 | 16/30 |

* cited by examiner

CASTER INSTALLATION SYSTEM

CROSS-REFERENCE TO RELATED APPLICATIONS

This application claims the benefit of provisional App. Ser. No. 62/560,346, filed Sep. 19, 2017, and App. Ser. No. 62/649,117, filed Mar. 28, 2018.

BACKGROUND AND SUMMARY

The disclosure relates to a system that facilitates installing a caster with an object. In accordance with one aspect, the system includes at least one caster having a first stem portion and a set of second stem portions that mate with the first stem portion of the caster. The first stem portion is assemblable with each of the second stem portions in the set of second stem portions to form a complete stem for the caster. Each second stem portion in the set of second stem portions has a different outer dimension (e.g., an outer diameter and/or length) that accommodates a socket into which the combination of the selected second stem portion with the first stem portion (that is, a complete stem) and caster is inserted.

DESCRIPTION

Figure 1A:
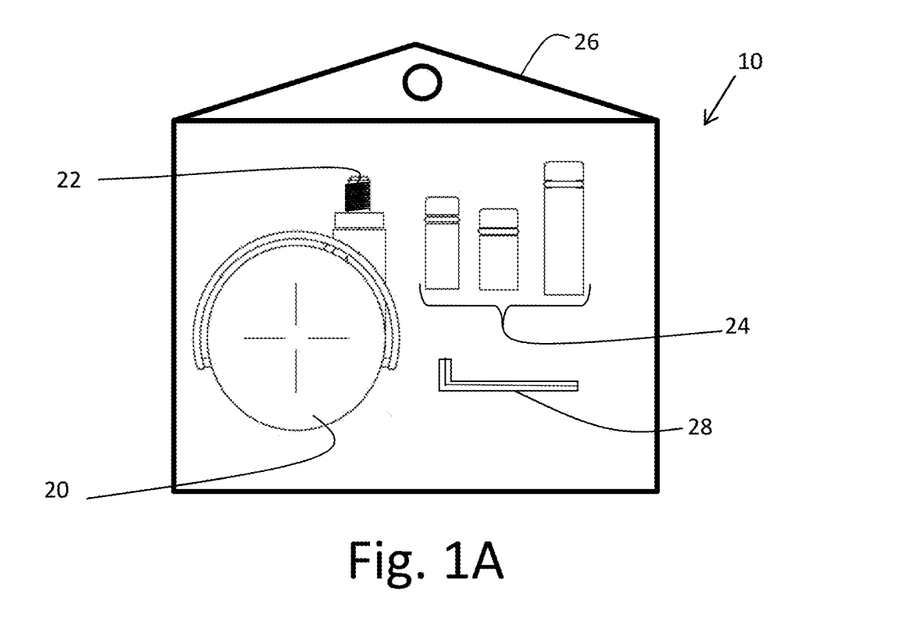
FIG. 1A shows a front elevational view of an exemplary system including a caster and a plurality of second stem portions that mate with the first stem portion of the caster.
Figure 1B:
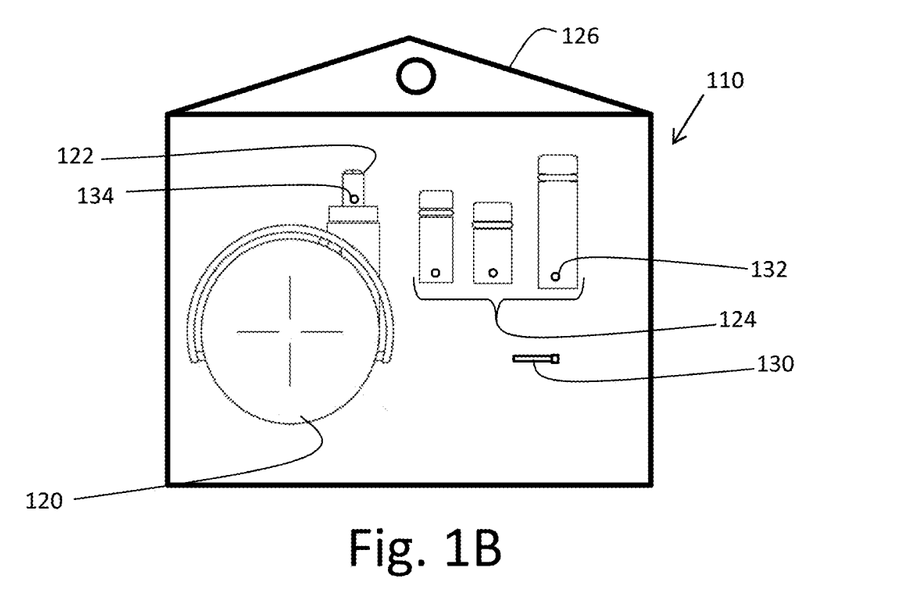
FIG. 1B shows a front elevational view of another exemplary system including a caster and a plurality of second stem portions that mate with the first stem portion of the caster.
Figure 2A:
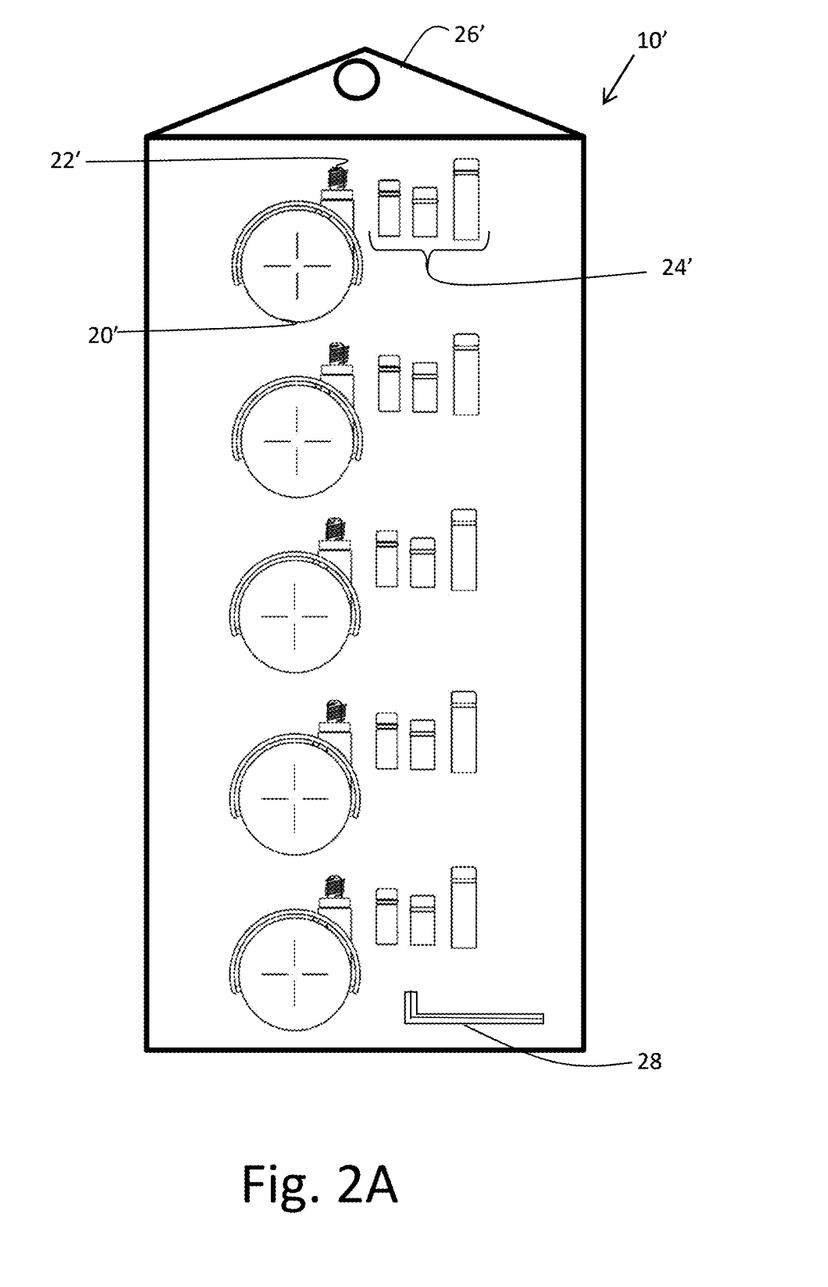
FIG. 2A is a front elevational view of an alternate embodiment of a system comprising a plurality of casters and a plurality of second stem portions that mate with the first stem portion of each caster in the plurality of casters.
Figure 2B:
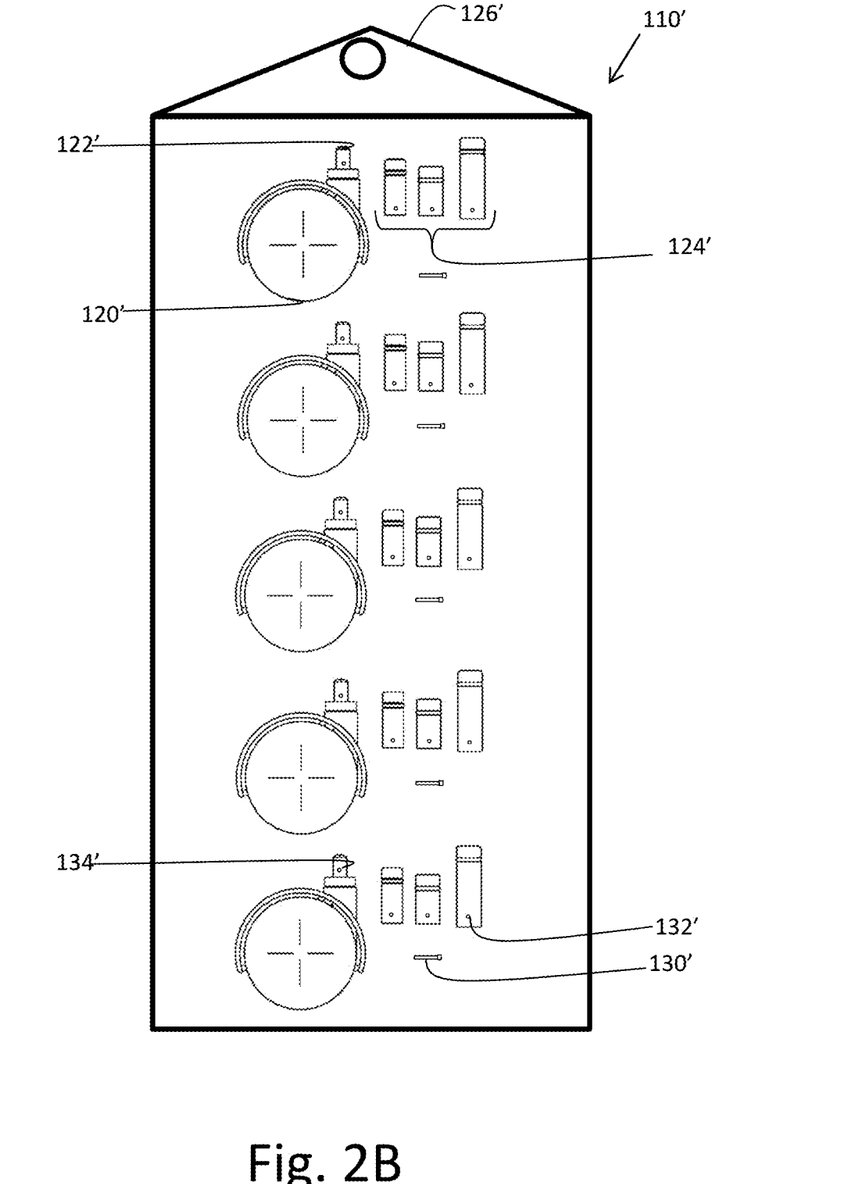
FIG. 2B is a front elevational view of an another alternate embodiment of a system comprising a plurality of casters and a plurality of second stem portions that mate with the first stem portion of each caster in the plurality of casters.

FIGS. 1A, 1B, 2A and 2B show different embodiments of exemplary systems 10,110,10',110' comprising packaging including a caster 20,120,20',120' with a first stem portion 22,122,22',122' and a set of second stem portions 24,124, 24',124' that are assemblable with the first stem portion of each caster. FIGS. 1A and 1B show exemplary systems 10,110 including a single caster 20,120 and a set of three second stem portions 24,124 that fit with the respective caster. FIGS. 2A and 2b show exemplary systems 10',110' including multiple casters 20'120' with matching sets of three second stem portions 24',124' that fit with the respective caster in the plurality of casters. In FIGS. 1A, 1B, 2A and 2B, the system 10,110,10',110' is contained in a package 26,126,26',126' which may be sold at retail, for instance, a blister package containing the caster(s) 20,120,20',120' and the second stem portions 24,124,24',124'. As shown in FIGS. 1A, and 2A, an installation tool 28 for instance, a hex-shaped wrench, may be included in the package. Instructions may be included on or within the package. By way of example and not in any limiting sense, the systems 10',110' of FIGS. 2A and 2B may be configured for a typical office chair and may include 5 twin wheel casters having a reference diameter of about 51 mm (2 inches), along with 15 second stem portions (i.e., a set of 3 second stem portions for each caster in the system). Again, by way of example and not in any limiting sense, in the systems 10',110' of FIGS. 2A and 2B, there may be a set of three second stem portions 24',124' for each caster 20',120': (a) ⅜ inch diameter by 1 inch long, (b) a 7/16 inch diameter by ⅞ inch long; and (c) 7/16 inch diameter by 17/16 inch long, each representing common socket dimensions for office desk chairs. The systems 10,110 of FIGS. 1A and 1B may be similarly configured but for a single caster 20,120.

Figure 3:
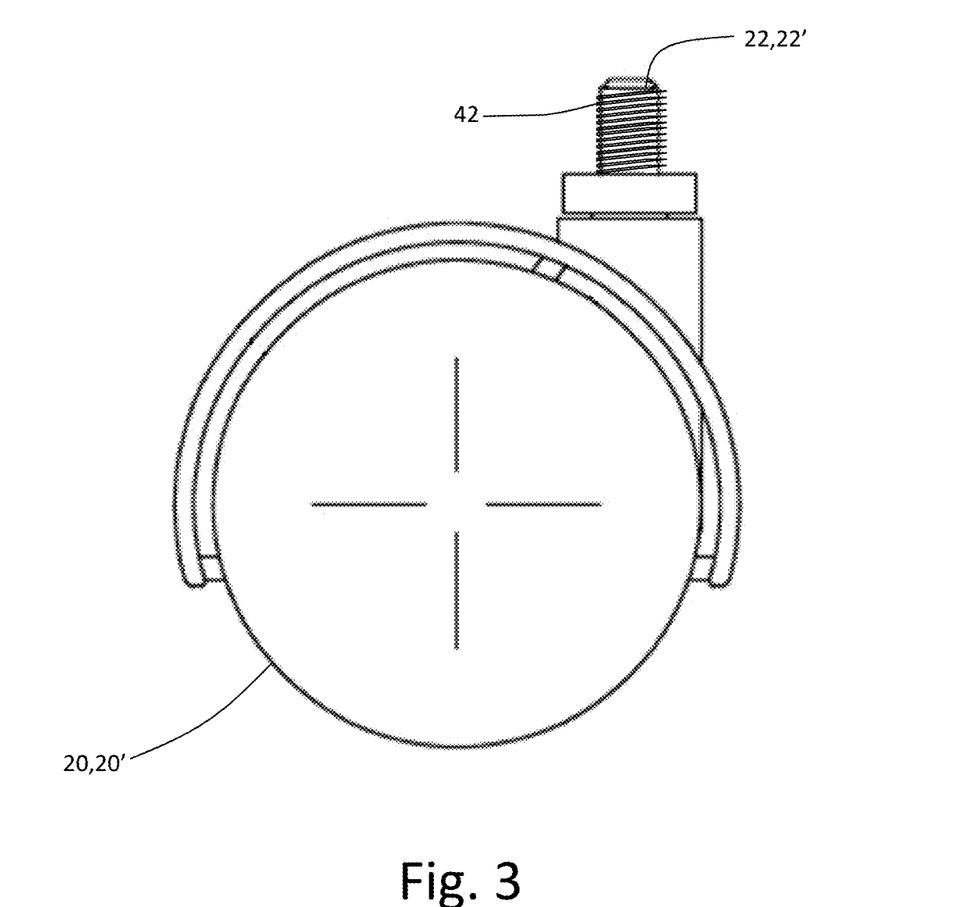
FIG. 3 is a front elevational view of an exemplary caster of the systems of FIGS. 1A and 2A.
Figure 4:
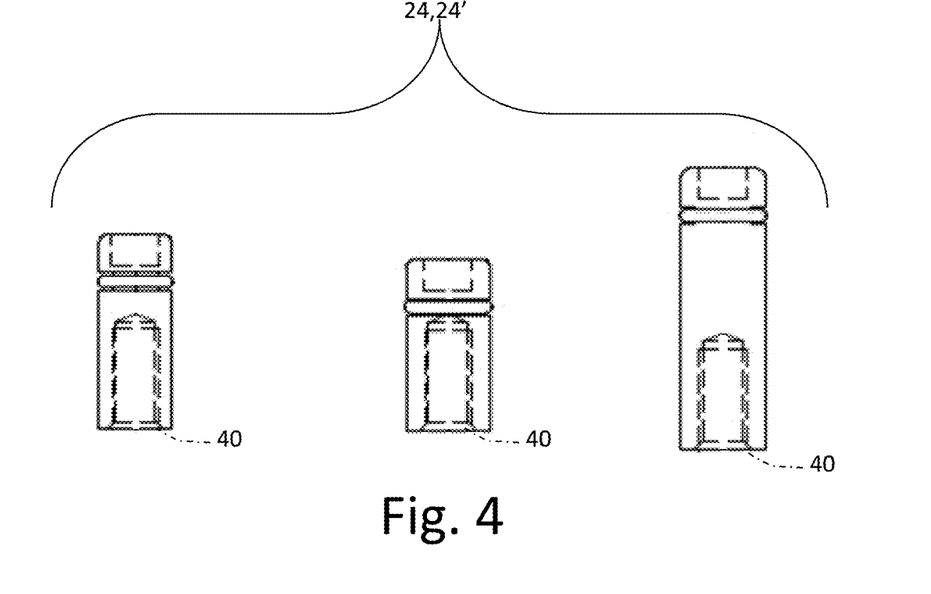
FIG. 4 is an elevational view of exemplary second stem portions that mate with the first stem portion of the caster of FIG. 3.

FIG. 3 shows an exemplary caster 20,20', for example, a caster that may be included in the systems 10,10' of FIGS. 1A and 2A. The caster 20,20' may have a wheel and body construction that may be typical as is known in the art. The caster 20,20' has a first stem portion 22,22' that may have a configuration that connects with each second stem portion 24,24' in the set of second stem portions for the caster. As best shown in the FIG. 3 the caster first stem portion 22,22' is threaded 42. The threading 42 may be set at M6×1×10 mm. The threading may be in accordance with the caster size, the loading of the caster, the caster stem dimensions, the second stem portion dimensions, etc., depending upon the application. Each caster 20, 120, 20', 120' in the system may have a similar first stem portion 22,122,22',122' configuration so as to allow use with any second stem portion 24,124,24',124' in the system. It is not necessary that the first stem portion or the second stem portion be threaded. The first stem portion and the second stem portion caster stem may include any geometry or interlocking feature that mates the first stem portion with the second stem portion to form a complete stem, and as described further below, may include a pin 130,130' and a through hole 132,132' in the caster second stem portion 124,124' and a through hole 134,134' in the caster first stem portion 122,122' as shown in FIGS. 1B, 2B, 8A and 8B.

Figure 8A:
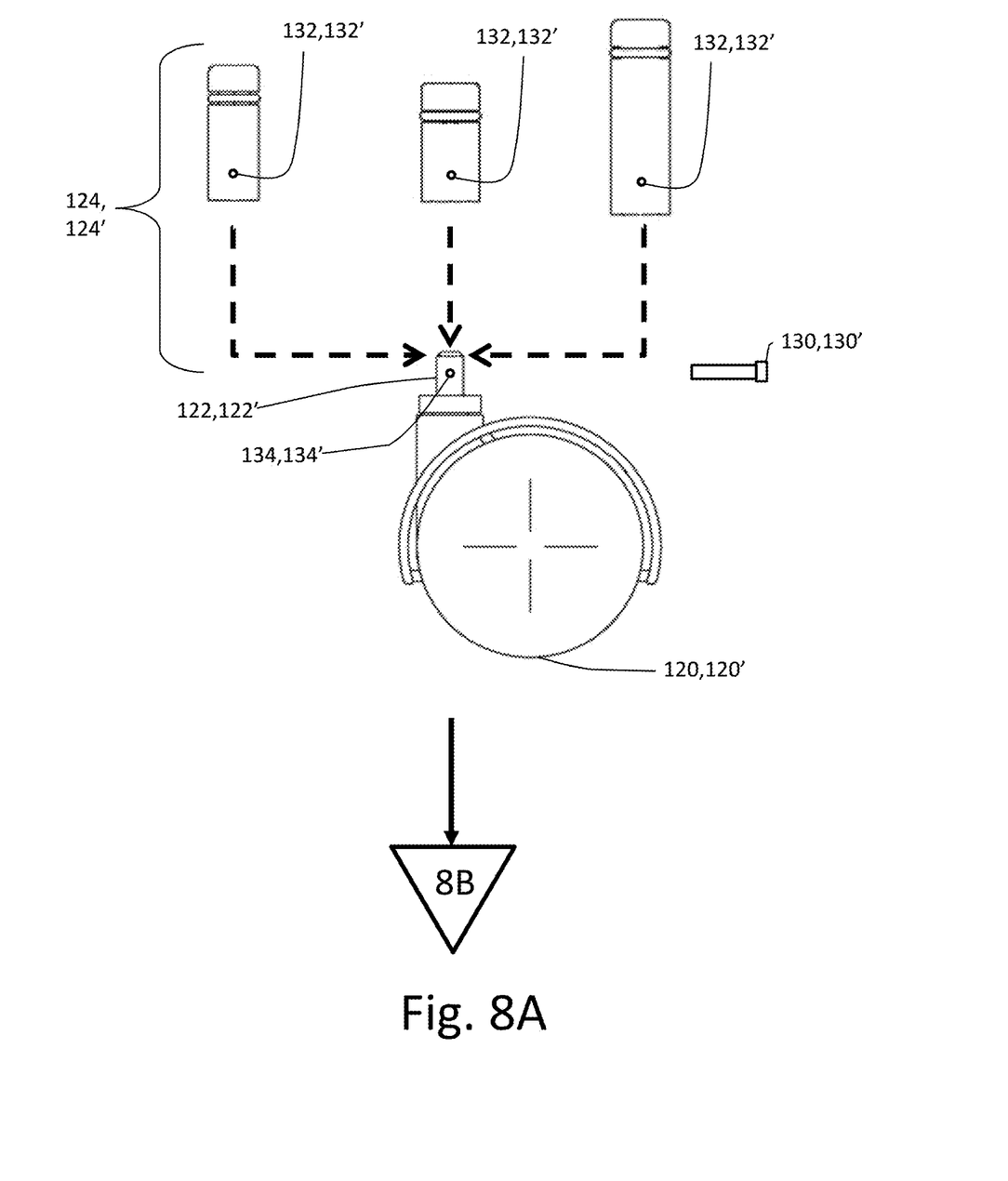
FIGS. 8A and 8B are schematic flow diagrams for assembly of the embodiment of a second stem portion with a first stem portion of the caster of the system shown in FIGS. 1B and 2B.
Figure 8B:
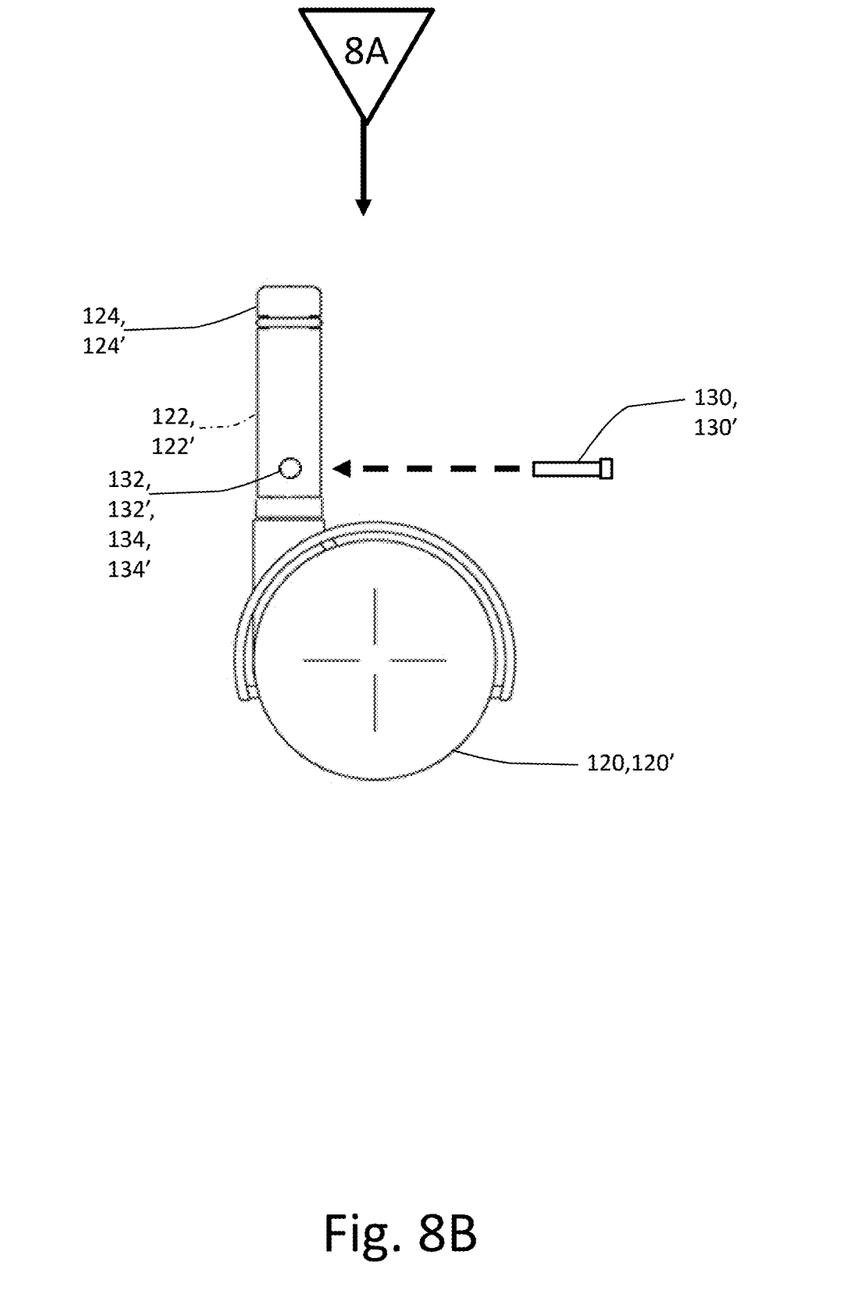

FIGS. 4-7 provide additional detail of an exemplary embodiment of the second stem portions 24,24' used with the caster 20,20' of FIG. 3. As described above, a set of three second stem portions 24,24' may be provided in the system 10,10' corresponding to the three most commonly used socket sizes associated with an office desk chair. The number of second stem portions in the set of second stem portions, and the dimensions of each second stem portion in the set of second stem portions may be selected as desired with a particular application. By way of example, the second stem portions 24,24' may each have the same bore configuration 40 that mates with the caster first stem portion 22,22' to allow the second stem portion to be secured to the caster first stem portion. The second stem portion bore configuration 40 may include any geometry or interlocking feature that mates with the caster first stem portion 22,22' to allow the second stem portion 24,24' to be secured to the first stem portion of the caster. As shown in the drawings, the second stem portion 24,24' has an internal threaded bore configuration 40 that mates with the threading 42 on the caster first stem portion, and thus provides a releasable connection. As shown in the drawings, the threading on the bore 40 of the second stem portions is a M6×1×10 mm. As mentioned above, the caster first stem portion 22,122,22',122' may include any geometry or interlocking feature that mates with the bore condition 40 of the second stem portion 24,124, 24',124' to allow the second stem portion to be connected to the first stem portion to form the complete stem of the caster. The connection may be releasable or non-releasable. As further examples, the second stem portion and the first stem portion may have smooth mating surfaces. The second stem portion and first stem portion may be held in an assembled condition by a pin (see, e.g., FIGS. 8A,8B (130,130'), set screw, direct mechanical connection, adhesive, or a temperature change shrink fit, tight slip fit, friction fit or interference fit. As a further example (not shown), the first stem portion may have features that ratchet or deflectingly engage with features of the second stem portion bore (and/or vice versa) and are otherwise not susceptible to removal through ordinary force without damage to a component. FIGS. 8A and 8B shows another embodiment where the second stem portion 124,124' and first stem portion 122,122' may be held in an assembled condition by an interlocking pin 130,130' that passes through the through hole 132,132' in the second stem portion 124,124' and the through hole 134,134' in the caster first stem portion 122,122'. As shown in FIG. 8B, when the through holes 132,132',134,134' of the second stem portion 124,124' and the first stem portion 122,122' are placed in register, the first stem connection configuration may be aligned with the second stem portion configuration and held in an assembled condition by the interlocking pin 130,130' that passes through the through hole in the second stem portion and the caster first stem portion. The pin may be held in place by the socket walls of the chair or other rollable object into which the caster is installed, and the downward force or load applied to the caster.

Each second stem portion 24,124,24',124' in the set of second stem portions that go with the caster 20,120,20',120' may have a different outer diameter and length that corresponds to common socket sizes. Again, by way of example and not in any limiting sense, the outer dimensions of the second stem portion 24,124,24',124' may be: (i) ⅜ inch diameter by 1 inch long, (ii) ⁷⁄₁₆ inch diameter by ⅞ inch long, and (iii) ⁷⁄₁₆ inch diameter by 1⁷⁄₁₆ inch long. The number of second stem portions 24,124,24',124' in the set of second stem portions that go with a caster 20,120,20',120' of the system, and the outer dimensions of the second stem portions may be selected based upon the application.

Figure 5:
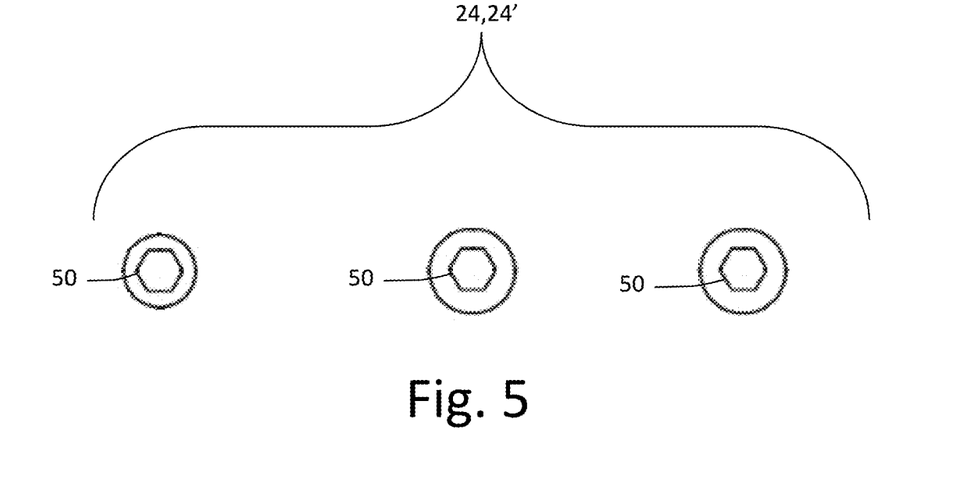
FIG. 5 is a top view of the second stem portions of FIG. 4.
Figure 6:
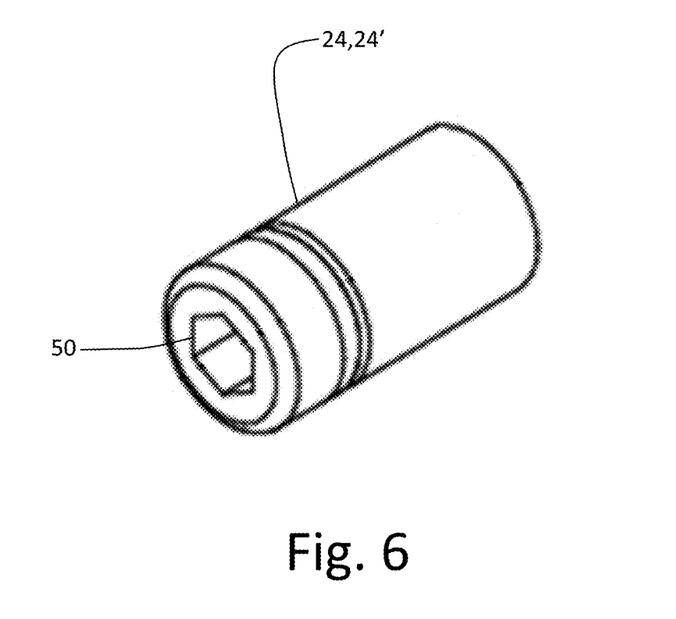
FIG. 6 is a perspective view of an exemplary second stem portion of the plurality of second stem portions shown in FIGS. 4 and 5.
Figure 7:
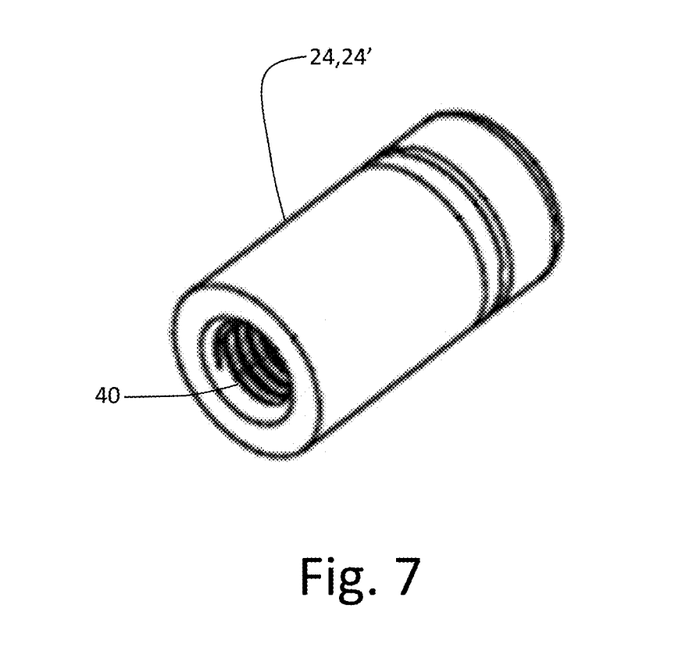
FIG. 7 is an alternate perspective view of the exemplary second stem portion shown in FIG. 6 that mates with the first stem portion.

As best shown in FIGS. 5 and 6, the top of each second stem portion 24,24' in the set of second stem portions may be provided with a tool engagement feature 50 to enable each second stem portion to be releasably secured to the caster first stem portion 22,22. As shown in FIGS. 5 and 6, each of the second stem portions are provided with a hexagonal socket head that receives a conventional Allen-type wrench 28 thereby enabling the user to threadably engage each second stem portion 24,24' with the caster first stem portion 22,22'.

As shown in FIGS. 8A and 8B, each of the second stem portions 124,124' have a socket that fits over the first stem portion 122,122' of the caster 120,120'. The second stem portion through hole 132,132' may be brought in register with the through hole 134,134' formed in the first stem portion 122,122' of the caster 120,120'. Once aligned, the pin 130,130' or other mechanical fastener may be directed through the through holes to connect the second stem portion with the first stem portion of the caster. As another example (not shown), threading may be provided on the second stem portion through hole, and once aligned, a screw fastener may be directed through the holes to connect the second stem portion with the first stem portion of the caster.

The second stem portion outer diameter and length dimensions correspond to the most common socket sizes. By purchasing a caster with a set of second stem portions, the user may select the second stem portion that corresponds to the socket and insert the caster in the second stem portion. This obviates the need for the user to know the exact dimension of the socket and eliminates the need to produce similar casters differing only in stem dimension.

In accordance with another aspect of the disclosure, the second stem portions may be supplied as a separate item apart from the casters. Also, a tool for assembly of the caster with second stem portion may be supplied with the system. End users with a rollable object requiring a caster may access the system and be directed through instructions for arranging the second stem portions and the casters in one or more sockets of the object. The instructions may include text or other indicia directing use of the second stem portions, the casters, and/or the tool for assembly of the second stem portions with the casters. In connection with the sale or distribution of the second stem portions alone or together with the casters, the user (e.g., a purchaser of the second stem portions and/or casters) is instructed that the purpose of the second stem portions is to install the applicable second stem portion with the caster depending upon the socket size of the object, and install the components in the object. Thus, the user is induced to replace, remove, and install the components in the object.

The embodiments were chosen and described in order to best explain the principles of the disclosure and their practical application to thereby enable others skilled in the art to best utilize the disclosed embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A system comprising:
    a caster having a first stem portion with a first stem portion connection configuration, and
    a plurality of second stem portions comprising a set of second stem portions, at least two second stem portions in the set of second stem portions having an identical second stem portion connection configuration, at least one second stem portion in the set of second stem portions having outer dimensions differing from outer dimensions of another second stem portion in the set of second stem portions;
    wherein the caster first stem portion connection configuration is adapted to mate with the second stem portion connection configuration of the at least two second stem portions in the set of second stem portions having the identical second stem portion connection configuration.

2. The system of claim 1 wherein each second stem portion in the set of second stem portions has the identical second stem portion connection configuration.

3. The system of claim 1 wherein one second stem portion in the set of second stem portions has outer dimensions differing from outer dimensions of all other second stem portions in the set of second stem portions.

4. The system of claim 1 wherein the set of second stem portions is three second stem portions.

5. The system of claim 1 wherein the set of second stem portions includes at least one second stem portion with a ⅜ inch diameter and a 1 inch length, one second stem portion with a 7/16 inch diameter and a ⅞ inch length, and one second stem portion with a 7/16 inch diameter and a 1 7/16 inch length, and one caster having a 2 inch reference diameter.

6. The system of claim 1 wherein the identical second stem portion connection configuration of the at least two second stem portions in the set of second stem portions includes threading.

7. The system of claim 6 wherein the first stem portion connection configuration includes threading which is engageable with the threading of the second stem portion connection configuration of the at least two second stem portions in the set of second stem portions.

8. The system of claim 1 wherein the first stem portion connection configuration includes threading.

9. The system of claim 8 wherein the identical second stem portion connection configuration of the at least two second stem portions in the set of second stem portions includes threading which engages the threading of the first stem portion connection configuration.

10. The system of claim 1, wherein the first stem portion connection configuration includes a hole, and the identical second stem portion connection configuration includes a complementary hole that may be placed in register with the first stem portion connection configuration hole.

11. The system of claim 10, further comprising a pin that passes through the holes in the second stem portion connection configuration and the first stem portion connection configuration.

12. A method comprising:
providing a plurality of second stem portions comprising a set of second stem portions wherein at least two second stem portions in the set of second stem portions have an identical second stem portion connection configuration, at least one second stem portion in the set of second stem portions has outer dimensions differing from outer dimensions of another second stem portion in the set of second stem portions; and
directing a user to: (i) select the second stem portion from the set of second stem portions having outer dimensions that match a socket of an object; and (ii) install the selected second stem portion on a first stem portion of a caster.

13. The method of claim 12 further comprising providing a caster having the first stem portion with a first stem portion connection configuration, the first stem portion connection configuration mating with the second stem portion connection configuration of the at least two second stem portions in the set of second stem portions having the identical second stem portion connection configuration.

14. The method of claim 13 further comprising directing the user to install the caster assembled with the selected second stem portion into the socket of the object.

15. The method of claim 12 wherein the step of providing the plurality of second stem portions includes providing all of the second stem portions in the set of second stem portions with the identical second stem portion connection configuration.

16. The method of claim 12 wherein the step of providing the plurality of second stem portions includes providing one second stem portion in the set of second stem portions with outer dimensions differing from outer dimensions of all of the other second stem portions in the set of second stem portions.

17. The method of claim 12 wherein the step of providing the plurality of second stem portions includes providing three second stem portions in the set of second stem portions.

18. The method of claim 13 wherein:
the step of providing the plurality of second stem portions includes providing at least one second stem portion with a ⅜ inch diameter and a 1 inch length, one second stem portion with a 7/16 inch diameter and a ⅞ inch length, and one second stem portion with a 7/16 inch diameter and a 1 7/16 inch length; and
the step of providing the caster includes providing one caster having a 2 inch reference diameter.

19. The method of claim 13, wherein:
the step of providing the caster with the first stem portion connection configuration includes providing the first stem portion connection configuration with a hole, and
the step of providing the plurality of second stem portions comprising the set of second stem portions includes providing the identical second stem portion connection configuration with a complementary hole;
the method further comprising directing the user to place the second stem portion connection configuration hole in register with the first stem portion connection configuration hole.

20. The method of claim 19, further comprising directing a user to direct a pin through the hole in the second stem portion connection configuration and the first stem portion connection configuration.

* * * * *